United States Patent
Stangier et al.

(10) Patent No.: US 6,457,897 B1
(45) Date of Patent: Oct. 1, 2002

(54) VARIABLE-LENGTH CONNECTING ELEMENT

(75) Inventors: Theodor Stangier, Morsbach; Klaus Leyendecker, Hattert; Rüdiger Dalchow, Gummersbach, all of (DE)

(73) Assignee: Montaplast GmbH, Morsbach (DE)

( * ) Notice: Subject to any disclaimer, the term of this patent is extended or adjusted under 35 U.S.C. 154(b) by 2 days.

(21) Appl. No.: 09/653,017

(22) Filed: Sep. 1, 2000

(30) Foreign Application Priority Data

Sep. 2, 1999 (DE) .......................................... 199 41 995

(51) Int. Cl.⁷ ............................. F16C 1/10; F16B 7/10
(52) U.S. Cl. ................... 403/104; 403/379.2; 403/283; 403/282; 74/886
(58) Field of Search ................................. 403/379, 378, 403/379.2, 379.4, 104, 355, 283, 279, 281, 109.1, 109.5, 109.6; 74/886

(56) References Cited

U.S. PATENT DOCUMENTS

| | | | |
|---|---|---|---|
| 4,127,354 A | * 11/1978 | Mixon, Jr. .................. 403/279 |
| 4,364,685 A | * 12/1982 | Janz ........................ 403/355 X |
| 4,852,425 A | * 8/1989 | Stocker ........................ 74/586 |
| 4,887,930 A | 12/1989 | Chaczyk et al. | |
| 4,889,006 A | 12/1989 | Kolinske et al. | |
| 5,163,338 A | * 11/1992 | Sharp et al. ............ 403/104 X |
| 5,220,832 A | * 6/1993 | Petruccello ............. 403/104 X |
| 5,232,245 A | * 8/1993 | Gorney et al. .......... 403/377 X |
| 5,394,770 A | * 3/1995 | Boike et al. ............ 403/104 X |
| 5,556,224 A | * 9/1996 | Niskanen ..................... 403/379 |
| 5,571,237 A | * 11/1996 | Lu et al. ................. 403/104 X |
| 5,850,763 A | 12/1998 | Kitamura | |

FOREIGN PATENT DOCUMENTS

| | | | |
|---|---|---|---|
| DE | 40 24 062 C1 | 4/1992 | |
| DE | 41 09 952 A1 | 10/1992 | |
| GB | 955110 | * 4/1964 | ................. 403/104 |
| GB | 2 275 316 A | 8/1994 | |

* cited by examiner

Primary Examiner—Lynne H. Browne
Assistant Examiner—John R. Cottingham
(74) Attorney, Agent, or Firm—Akin, Gump, Strauss, Hauer & Feld, L.L.P.

(57) ABSTRACT

The invention relates to a preferably rod-shaped and variable-length connecting element for transmitting traction or pressure forces between at least two points of application of force, from and to assemblies connected to the connecting element, with fastening elements located on the free ends of the connecting element for fastening the connecting element to the assemblies. The invention is based on the object of improving a connecting element of this kind so that it can be assembled more easily and accurately. According to the invention, it is proposed that the connecting element be of essentially two-part design, having a receiving element and a plug-in element that can be inserted into the receiving element in a manner at least permitting longitudinal displacement and that can be fixed in the receiving element in a desired position relative to the receiving element.

6 Claims, 3 Drawing Sheets

VARIABLE-LENGTH CONNECTING ELEMENT

BACKGROUND OF THE INVENTION

The invention relates to a variable-length connecting element for transmitting traction or pressure forces from and to assemblies connected to the free ends of the connecting element by means of fastening elements. The connecting element of this kind is preferably of rod-shaped design.

It is known practice to manufacture rod-shaped and variable-length connecting elements, hereinafter referred to as link rods, from a metal rod, the free ends of which are, for example, provided with threads having opposite directions. Fastening elements having, for example, an eye surrounding a bolt or an axle, can be screwed onto these threads.

Link rods are used, for example, for actuating switching and control elements for air routing in internal-combustion engines, e.g. in intake systems. The link rod connects a lever arm connected to a stepping motor with a shaft located in the intake manifold of the vehicle for controlling the timing angle of the valve flaps fastened to the shaft. The position of the stepping motor adjusts the timing angle of the flaps as required. The flaps determine the degree of swirl of the air and thus affect the emission characteristics and fuel consumption of the engine. The flaps must be adjusted to a certain position during assembly. This positioning is achieved by way of the adjustable link rod.

It must be possible to set the link rod to different lengths, in order to be able to balance out tolerance fluctuations between the components, compensate for play occurring between the components and be able to use these as universally manufacturable components with different engine geometries. In the simplest version, the length is adjusted by turning the metal rod, thus axially displacing the fastening elements mounted on the threads at the ends. Lock nuts can additionally be provided on the threads. Accordingly, rotary movement is required for fixing and alignment. In confined engine compartments, it may be difficult to gain access, with the result that this rotary movement cannot be performed without problems. In addition, it is usually only necessary to adjust the position of one fastening element. However, the rotary movement acts on both of the opposite threads provided on the ends, meaning that the end not requiring adjustment is also displaced. In this way, undesirable forces act on the assemblies connected by the link rod. This is particularly critical in relation to the sensitive stepping motor. Moreover, it is difficult, or even impossible in confined spaces, to obtain definitively reliable assembly, i.e. to achieve the necessary torque for fixing. The metal rod is usually designed as a metal casting of high weight. This contradicts the targeted reduction of weight in the automotive sector. Finally, the fixing of the fastening elements on the rod is a complex and time-consuming process.

SUMMARY OF THE INVENTION

The invention is based on the technical problem of designing a connecting element of the kind defined in the generic part of claim 1 that is lighter and can be assembled more accurately.

According to the invention, this technical problem is solved in that the connecting element is essentially of two-part design, having a receiving element and a plug-in element that can be inserted into the receiving element in a manner at least permitting longitudinal displacement and that can be fixed in the receiving element in a desired position relative to the receiving element.

As a result of the design according to the invention, the link rod with the two fastening devices can be fastened to the connecting elements and pushed together or pulled apart until the desired axial length is obtained. A fixing element locks the plug-in element in this position in the receiving element. In the preferred configuration, the fixing element is designed as an easily manufactured metal slide. As an alternative, it can also be designed as a metal ring with teeth on the flanks.

The receiving element and the plug-in element are preferably manufactured in the form of plastic injection mouldings, this not only resulting in a reduction in weight, but also offering resistance to aggressive media.

The plug-in element is customarily guided and mounted in the receiving element without play and in a manner allowing longitudinal displacement. In this context, snap-in devices formed between the receiving element and the plug-in element can prevent the components from unintentionally falling apart. When supplied, the elements are snapped together, but not adjusted, and are far easier to assemble than the rods known from the prior art. This advantage becomes particularly apparent in view of the higher degree of automation of mass production.

In the case of components that are critical in terms of movement, it is also desirable to prevent rotation of the receiving element relative to the plug-in element. It is thus sensible for the plug-in element to be guided in the receiving element in non-rotating fashion. This can be achieved, for example, by designing the receiving element with a non-round inner contour, into which the complementary, non-round outer contour of the plug-in element can be inserted in sliding fashion. An elliptical inner contour of the receiving element and an elliptical outer contour of the plug-in element are used with preference. If rotation of the two elements relative to each other is wanted, they can be provided with a round inner contour of the receiving element and a round outer contour of the plug-in element, so that the plug-in element can rotate in the receiving element.

In the preferred configuration, fixing of the plug-in element in the receiving element is achieved by using a fixing clip, which can be inserted in the desired position between the plug-in element and the receiving element. The fixing clip is slid into a receiving opening provided on the side of the receiving element for fixing in the desired position. Assembly and setting of the length can thus be performed with one hand without requiring tools. The fixing clip establishes both a non-positive and a positive connection between the plug-in element and the receiving element, as the fixing clip is provided with cutting edges that cut into the plastic during insertion. Seen in the cross-sectional view, the fixing clip is preferably designed as a U-shaped metal clip with two longitudinal limbs, running in the longitudinal direction and aligned parallel to each other, and a transverse limb connecting the longitudinal limbs.

Accordingly, the invention also relates to a fixing clip for fixing, and preventing relative movement between, a plug-in element manufactured from a plastic material and a receiving element manufactured from a plastic material into which it can be inserted, said fixing clip being capable of insertion between the elements in the desired position between the receiving element and the plug-in element in order to guarantee at least a positive connection. The link rod and/or the fixing of the relative positions of the receiving and plug-in elements by a fixing clip can, of course, also be used for other elements, such as for connecting the door knob with the door-opening mechanism. Also, the connecting element need not necessarily be of rod-shaped design. Using the fixing clip, it is also possible, for example, for several plug-in elements to be inserted in a receiving element of star-shaped design for accommodating several plug-in elements, or in an essentially Y-shaped receiving element. Accordingly, the essential aspect is the relative fixing of one plastic part in another by the fixing clip.

In order to guarantee particularly firm fixing of the fixing clip between the receiving element and the plug-in element, a preferred configuration of the fixing clip is provided with blade-like edges (cutting edges) which cut into the receiving element and/or the plug-in element during insertion between the plug-in element and the receiving element, in order to establish a positive connection between the receiving element and the plug-in element. It has proven particularly expedient to produce these cutting edges by bending the outer edges of the longitudinal limbs outwards.

In another advantageous configuration, the fixing clip is provided with means for fixing in the receiving element in various installation positions. In the simplest version, these means have at least one snap-in lug, provided on the receiving element, which can be integrally moulded on the receiving element, and at least one recess, provided on the fixing clip, which this snap-in lug engages. It is particularly advantageous if a recess for the snap-in lug is provided both in the pre-assembly position and in the position for fixing in the final condition. In the pre-assembly position, the snap-in lug engaging the recess prevents the fixing clip from unintentionally falling out of the receiving element. In the final, assembled position, the snap-in lug locks the fixing clip in the desired position.

The snap-in lug can be integrally moulded on the elements.

BRIEF DESCRIPTION OF THE SEVERAL VIEWS OF THE DRAWINGS

An example of the invention is illustrated in the drawings and described in detail below on the basis of the figures. The figures show the following.

DETAILED DESCRIPTION OF THE INVENTION

Figure 1:
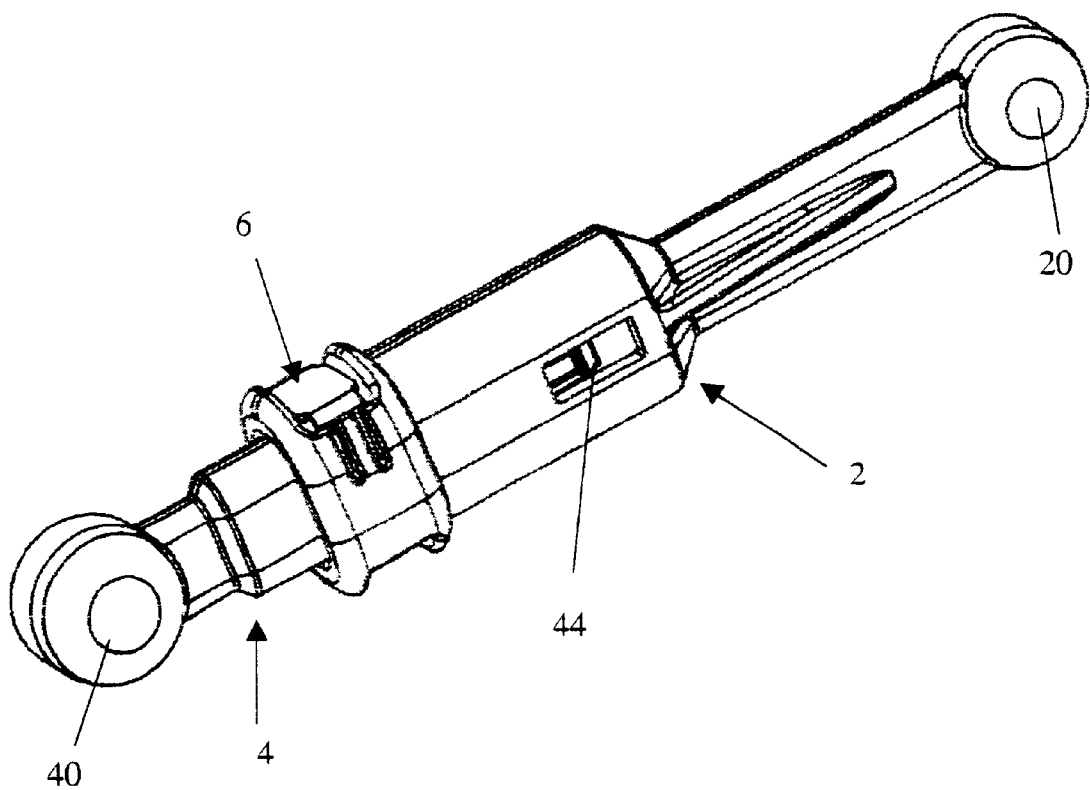
FIG. 1 A front view of the assembled link rod.

As can be seen from FIG. 1, the present connecting element of rod-shaped design essentially consists of receiving element 2, in which plug-in element 4 is locked in the desired position by fixing clip 6. Fixing clip 6 prevents relative movement between receiving element 2 and plug-in element 4.

Receiving element 2 and plug-in element 4 are both plastic injection mouldings and the free end of each is provided with an integrally moulded ball socket 20 and 40 for fastening to assemblies. In the present configuration, ball sockets 20 and 40 are integrally injection-moulded on receiving element 2 and plug-in element 4. The fastening elements designed as ball sockets for an eye-type bearing can also be screwed onto the link rod or connected to it by snap-fitting connections. In addition, the fastening elements need not be ball sockets, it being equally possible to use eye-like connections for surrounding axles or shafts.

Figure 2:
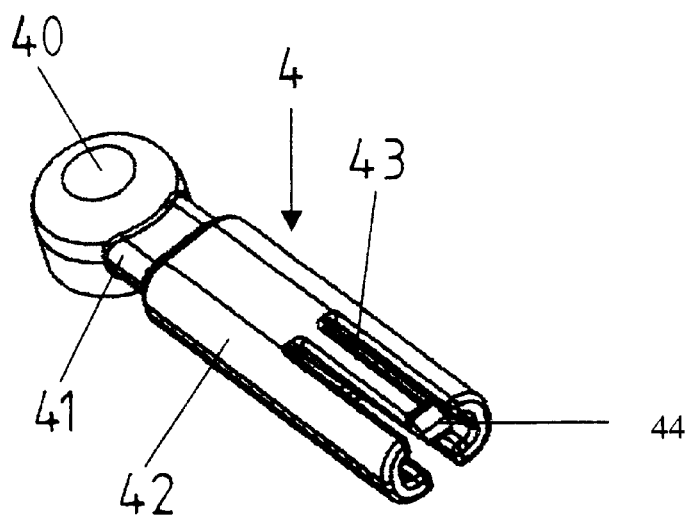
FIG. 2 A perspective view of the plug-in element.

The exact structure of the plug-in element can be seen particularly well in FIG. 2, which shows a perspective view of this component. Immediately following on from ball socket 40 comes the integrally moulded, rod-shaped web 41, which becomes wider towards the outside before merging into plug-in area 42. Plug-in area 42 extends up to the front end of plug-in element 4. Roughly in the middle of plug-in area 42, which is of hollow design on the inside, a snap-in tab 43 is provided, which extends in the longitudinal direction of plug-in element 4. A snap-in lug 44 is integrally moulded on the front end of snap-in tab 43. Snap-in tab 43 is of resilient design and, when assembled, engages opening 23 of receiving element 2, which is described further below. In this way, receiving element 2 and plug-in element 4 are captively joined, but longitudinally adjustable relative to each other, so that the link rod can be set to any desired length. The hollow design of plug-in area 42 of plug-in element 4 means that this component is particularly suitable for injection moulding and displays very good cooling properties of the plastic.

Figure 3:
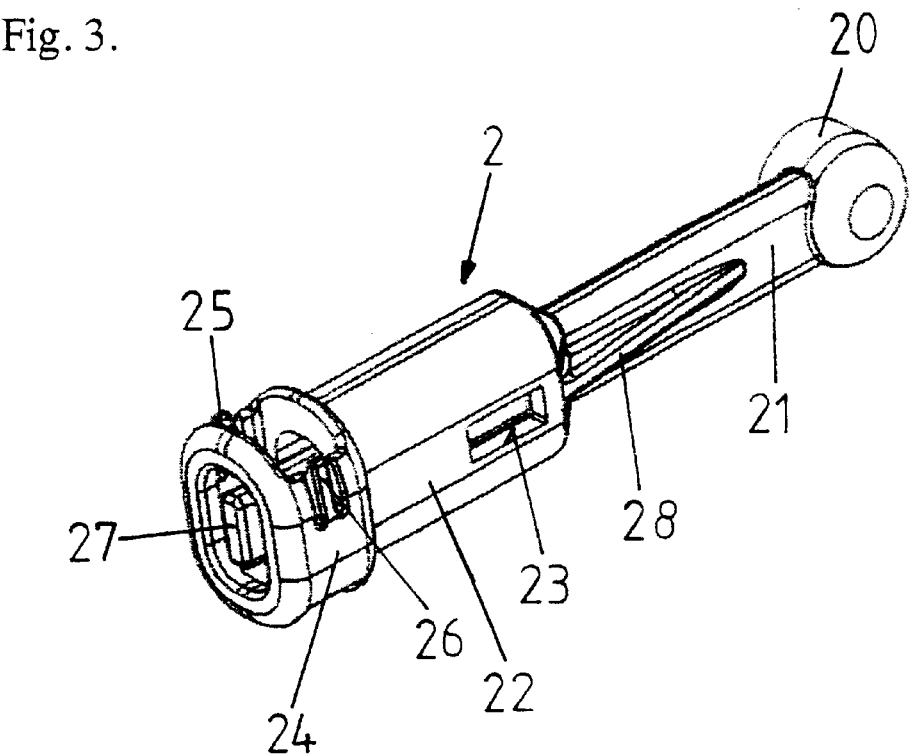
FIG. 3 A perspective view of the receiving element.

FIG. 3 shows a perspective view of receiving element 2 without plug-in element 4 inserted. Immediately following on from ball socket 20 in the longitudinal direction comes a rod-shaped web 21, which, roughly in the middle, merges into the wider receiving area 22, the inside of which is of hollow design. Receiving area 22 is designed to be roughly twice as wide as web 21. The previously described rectangular opening 23, into which snap-in lug 44 of plug-in element 4 can be inserted in longitudinally sliding fashion, is oriented to run in the longitudinal direction of receiving area 22. Snap-in lug 44 prevents plug-in element 4 from unintentionally falling out of receiving element 2, as its undercut runs up against the front, short edge of opening 23 when plug-in element 4 is pulled out of receiving element 2.

At the front end of receiving element 2, receiving area 22 again becomes wider to form a second receiving area 24, running at right angles to the longitudinal direction of receiving area 22, for fixing clip 6.

Finger-like snap-in tabs 25 and 26 are integrally moulded on the end of receiving area 24 shown at the top in the figure. These snap-in tabs 25 and 26 engage openings, to be described further below, in both sides of fixing clip 6, thus making it possible to captively fix fixing clip 6 in various positions in receiving element 2. Snap-in tabs 25 and 26 are integrally moulded on receiving area 24 for the fixing clip, of resilient design and provided, on the end at the front in installed position, with a snap-in lug displaying an undercut and pointing towards the inside of receiving element 4.

A web 27, likewise running in the longitudinal direction, is integrally moulded in receiving area 22. When plug-in element 4 is inserted into receiving element 2, this web 27, which is designed with a rectangular cross-section, engages the front opening of plug-in area 42. The inner contour of plug-in area 42 essentially corresponds to the outer contour of web 27. The rectangular design of web 27 ensures that plug-in element 4 is guided in non-rotating and longitudinally sliding fashion in receiving element 2 and establishes the frictional connection between the elements.

In order to increase the longitudinal stiffness, receiving element 2 is provided, in the area of web 27, with a further transverse web 28, which runs in the longitudinal direction of receiving element 2.

Figure 4:
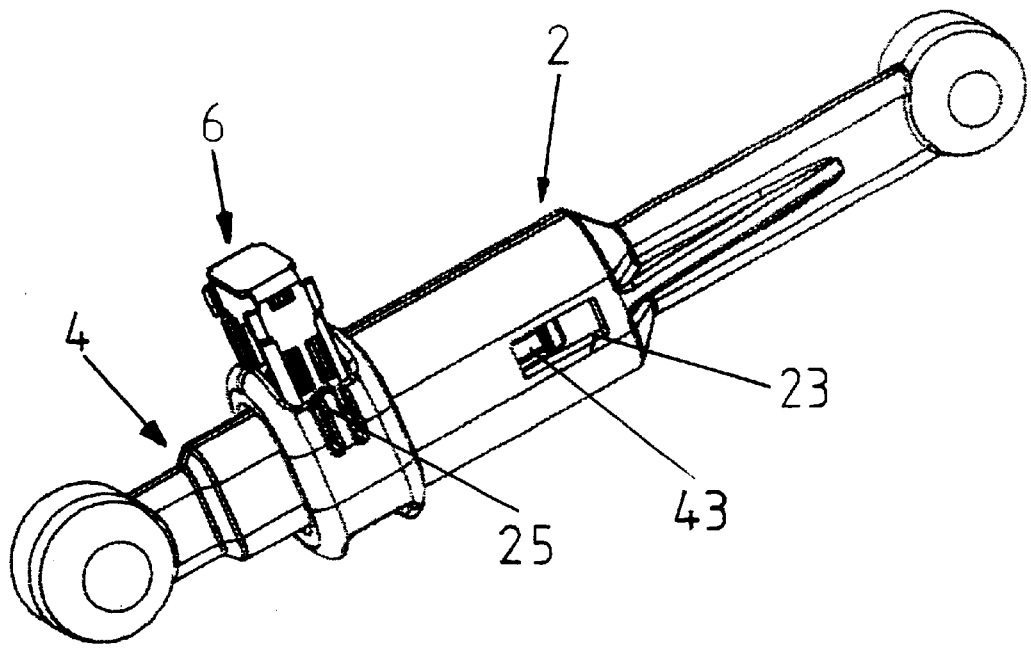
FIG. 4 A front view of the procedure of fixing the plug-in element in the receiving element by means of the fixing clip, FIG. 5 A perspective view of the fixing clip, and FIG. 6 A view of the fixing clip from below.

FIG. 4 shows plug-in element 4 inserted in receiving element 2 with fitted fixing clip 6 in the pre-assembly position. The link rod is delivered in this position. The connecting element is not yet fixed in its desired position in terms of length.

In this position, snap-in tabs 25 and 26 of receiving area 24 for fixing clip 6 engage recesses provided on the front end of the longitudinal limbs or fixing clip 6, so that fixing clip 6 is fixed relative to receiving element 2 and fixing clip 6 is prevented from unintentionally falling out.

As soon as the connecting element has been set to the required length, fixing clip 6 is pressed into receiving area 24 for fixing clip 6. This can be done with one hand and requires little space for access. When in the desired position, the fixing clip is inserted completely into receiving area 24, as illustrated in FIG. 1. During insertion, edges provided on the longitudinal limbs of fixing clip 6 cut into the plastic of receiving element 2 and plug-in element 4. Once in the desired position, the longitudinal limbs of fixing clip 6 reach around the outside of plug-in area 42. Fixing clip 6 thus establishes a positive and non-positive connection between both receiving element 2 and plug-in element 4, meaning that the creep of the plastic is compensated for. Once fixing clip 6 is completely inserted, the elements are inseparably connected to each other.

Figure 5:
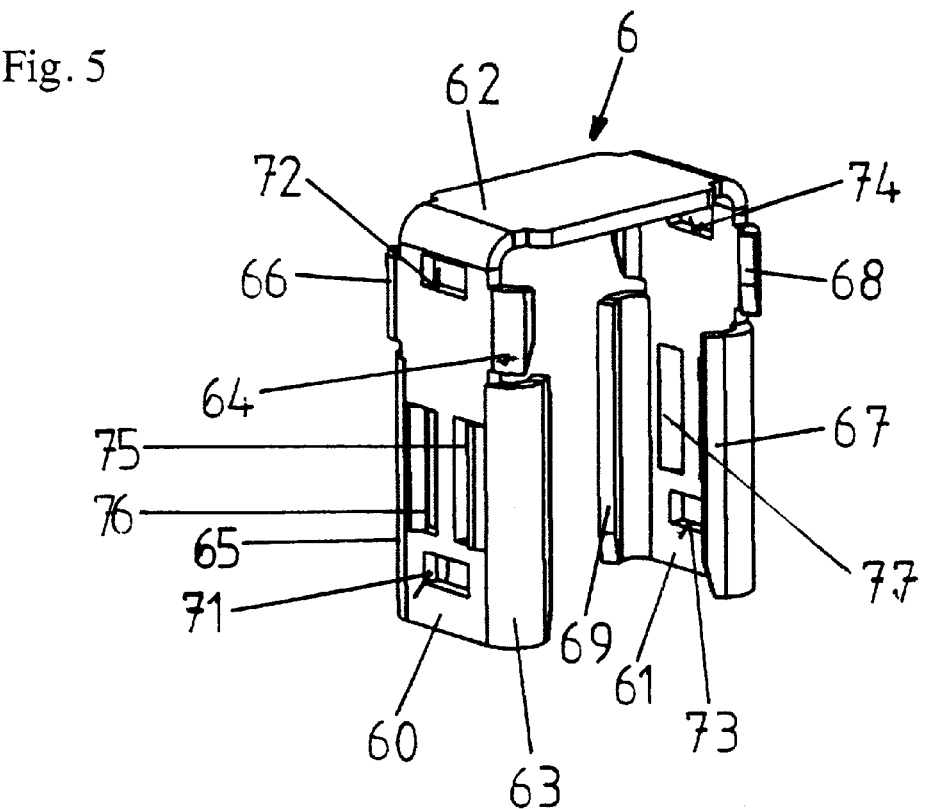
Figure 6:
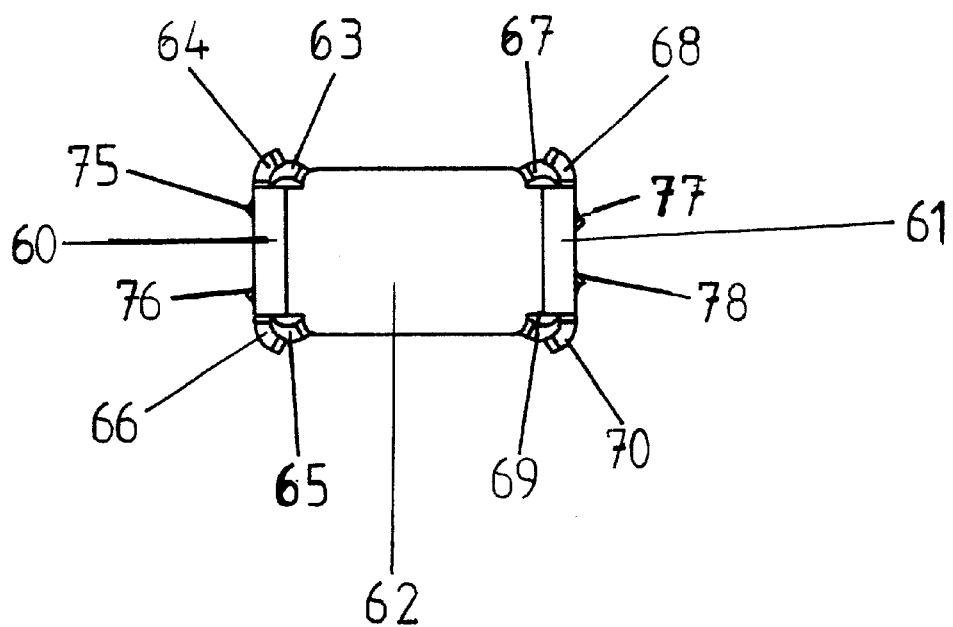

FIG. 5 shows an enlarged, perspective view of fixing clip 6. Fixing clip 6 consists of an essentially U-shaped, bent metal part with two essentially parallel longitudinal limbs 60 and 61, which are integrally connected by transverse limb 62. The longitudinal edges of longitudinal limbs 60 and 61 are provided with cutting edges 63 to 70, which are of wing-like design and likewise integrally moulded on the longitudinal limbs. Cutting edges 63 to 70 are designed as tab-like extensions that are bent into the desired position. They have an arc-shaped curvature. Cutting edges 63, 65, 67 and 69 are bent further inwards in relative terms. These cutting edges cut into plug-in area 42 of plug-in element 4 when in the installed position, whereas cutting edges 64, 66, 68 and 70, which are bent further outwards, cut into the inside of receiving area 24 for the fixing clip in the installed position. Accordingly, cutting edges 64, 66, 68 and 70 project further from longitudinal limbs 60 and 61 of fixing clip 6. The different radii of curvature of cuttings edges 63 to 70 of fixing clip 6 can be seen particularly well in FIG. 6, which shows a face-end view of fixing clip 6 as per FIG. 5 from below. Compared to the others, cutting edges 63, 65, 67 and 69 are offset towards the front on longitudinal limbs 60, 61 in relation to transverse limb 62 and are designed to be longer than the other cutting edges, in order to achieve a particularly firm connection to plug-in element 4.

Depending on the arrangement, cutting edges 63 to 70 can be designed to be of different lengths and bent with different radii.

Longitudinal limbs 60 and 61 of the fixing clip are provided with rectangular recesses 71 to 74, the longitudinal dimension of which lies transverse to longitudinal limbs 60 and 61. In assembled condition, snap-in tabs 25 and 26 of receiving element 2 engage these recesses 71 to 74, in order to fix fixing clip 6 in the pre-assembly position by means of openings 71 and 73, which are located at the front in relation to transverse limb 62, and in the desired final assembly position by means of rear openings 72 and 74. Fixing in front openings 71 and 73 captively retains fixing clip 6 in receiving element 2 in the pre-assembly position, as illustrated in FIG. 4.

Provided on the outside of longitudinal limbs 60 and 61 are elongated fixing ribs 75 to 78, which project from longitudinal limbs 60 and 61 and ensure a play-free fit of longitudinal limbs 60 and 61 within receiving area 24 in the final assembly position. These fixing ribs 75 to 78 are formed by cutting around three sides of a rectangular area which is then pressed together with the side connected to fixing clip 6, thus forming an area that projects from the plane of longitudinal limbs 60 and 61 in essentially triangular fashion.

List of Reference Numbers 2 receiving element
4 plug-in element
6 fixing clip
20 ball socket
21 web
22 receiving area
23 opening
24 receiving area for the fixing clip
25 snap-in tab
26 snap-in tab
27 web
28 transverse web
40 ball socket
41 web
42 plug-in area
43 snap-in tab
44 snap-in lug
60 longitudinal limb
61 longitudinal limb
62 transverse limb
63–70 cutting edge
71–74 opening
75–78 fixing rib

What is claimed is:

1. A variable-length connecting element for transmitting traction or pressure forces between assemblies connected to the connecting element via fastening elements located on free ends of the connecting element for fastening the connecting element to the assemblies, the connecting element comprising a receiving element and a plug-in element, wherein the connecting element is made of plastic, wherein the plug in element can be inserted, at least partially, into the receiving element in a manner permitting longitudinal displacement and can be fixed in a desired position relative to the receiving element, the plug-in element being fixed in the receiving element by a fixing clip which can be inserted between the plug-in element and the receiving element, wherein the fixing clip is made of sheet metal and has cutting edges which cut into the receiving element and the plug-in element during insertion.

2. The connecting element of claim 1 wherein the plug-in element is guided and mounted in the receiving element without play and in a manner allowing longitudinal displacement.

3. The connecting element of claim 1 wherein the plug-in element is guided in the receiving element in non-rotating fashion.

4. The connecting element of claim 1 wherein an outer contour of the plug-in element matches an inner contour of the receiving element.

5. A fixing clip for fixing and preventing relative movement between a plug-in element and a receiving element into which the plug-in element can be inserted, the receiving element and plug-in element being constructed of a plastic material, wherein the fixing clip is made of sheet metal, the fixing clip having means for insertion in a desired position between the receiving element and the plug-in element to guarantee at least a non-positive connection, the fixing clip including cutting edges which cut into the receiving element and the plug-in element during insertion in order to establish a positive connection between the receiving element and the plug-in element, wherein the fixing clip further includes means for fixing the plug-in element in the receiving element in various installation positions.

6. A fixing clip for fixing and preventing relative movement between a plug-in element and a receiving element into which the plug-in element can be inserted, the receiving element and plug-in element being constructed of a plastic material, wherein the fixing clip is made of sheet metal, the fixing clip having means for insertion in a desired position between the receiving element and the plug-in element to guarantee at least a non-positive connection, the fixing clip including cutting edges which cut into the receiving element and the plug-in element during insertion in order to establish a positive connection between the receiving element and the plug-in element, wherein at least one snap-in tab is provided on the receiving element and at least one recess or opening is provided on the fixing clip engaging the at least one snap-in tab to secure the fixing clip to the receiving element.

* * * * *